George Thomas Baker, Inventor
By Dezsoe Steinherz
Attorney

Sept. 30, 1952 G. T. BAKER 2,612,562

TELEGRAPH DISTRIBUTOR

Filed June 10, 1949 2 SHEETS—SHEET 2

George Thomas Baker, Inventor

By Dezsoe Steinherz
attorney

Patented Sept. 30, 1952 2,612,562

UNITED STATES PATENT OFFICE 2,612,562

TELEGRAPH DISTRIBUTOR

George Thomas Baker, Buckinghamshire, England, assignor to British Telecommunications Research Limited, Taplow, Buckinghamshire, England, a British company Application June 10, 1949, Serial No. 98,193
In Great Britain June 14, 1948

12 Claims. (Cl. 178—79)

Figure 3:
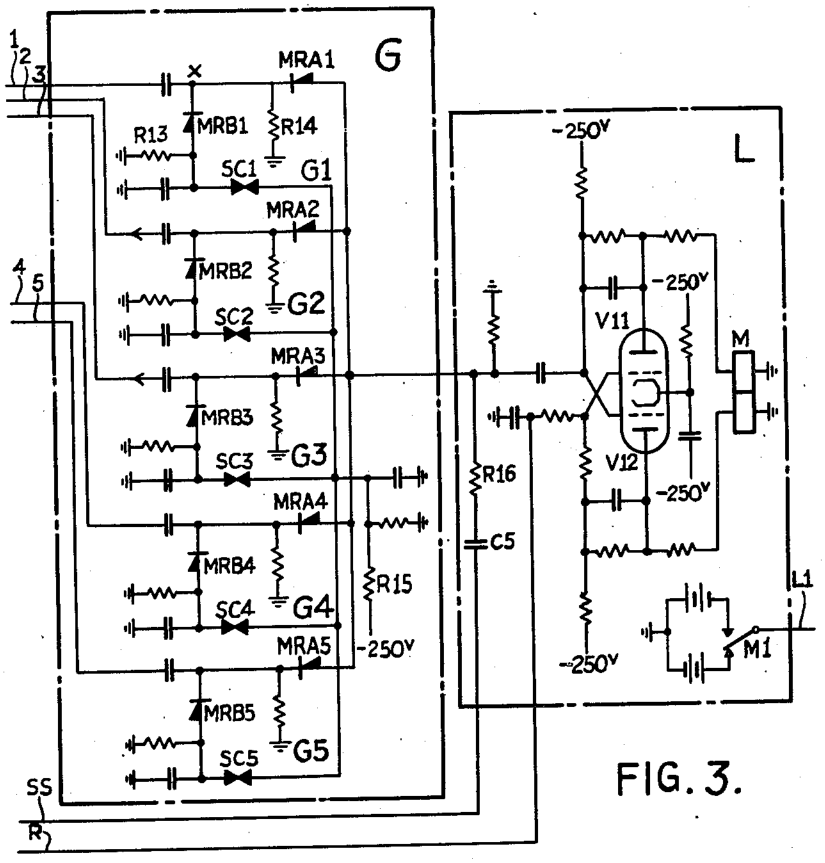

The present invention relates to circuit arrangements for use in an electrical signalling system and is more particularly concerned with arrangements for dividing line time into a plurality of cyclically recurring equal elements to enable the transmission of an item of information during each element.

A signalling system of this nature has many applications, for example, the remote transmission of different indications which may be continually varying or for the transmission of telegraph characters. The characteristic of the signalling system is that the items of information are available simultaneously and are transmitted successively by the division of line time. In the case of telegraph transmission this has been done by means of a rotating contact arm or set of cams which is coupled by a clutch to a continuously-running motor. To maintain an accurate transmission speed in the face of the clutch impact and other variables, a fairly powerful motor is required together with governor control. The amount of energy expended is therefore considerable and the mechanism is somewhat complex.

It is an object of the present invention to provide electronic arrangements for the division of line time and in particular to provide an electronic telegraph distributor operating on the start-stop principle.

According to one feature of the invention, a set of potentials representative of the information to be transmitted during each element of a cycle is simultaneously applied to a plurality of control circuits and serves to determine whether pulses fed successively to said control circuits shall or shall not pass therethrough to effect the operation of a transmitting device which is arranged to transmit one signal in response to a pulse and to transmit a different signal in the absence of a pulse.

According to a further feature of the invention, a cyclic electronic counter driven from a pulse source is arranged to feed pulses successively to a plurality of control circuits which are simultaneously conditioned according to the items of information to be transmitted during the elements of a cycle to absorb said pulses or to pass said pulses to a transmitting device which is arranged to transmit one signal in response to a pulse and to transmit a different signal in the absence of a pulse.

According to a further feature of the invention, a telegraph distributor comprises a source of pulses, means for feeding said pulses over one path to cause a transmitting device to transmit signals of one kind, means for feeding said pulses over a second path to cause said transmitting device to transmit signals of a different kind and an electronic cyclic counter in said second path for delivering pulses successively to a plurality of control circuits which are simultaneously conditioned in accordance with the elements of a character to be transmitted to absorb said pulses or to pass said pulses to said transmitting device, the transmitting device being so arranged that the reception of a pulse over said second path nullifies the effect of the reception of the corresponding pulse over said first path.

Figure 1:
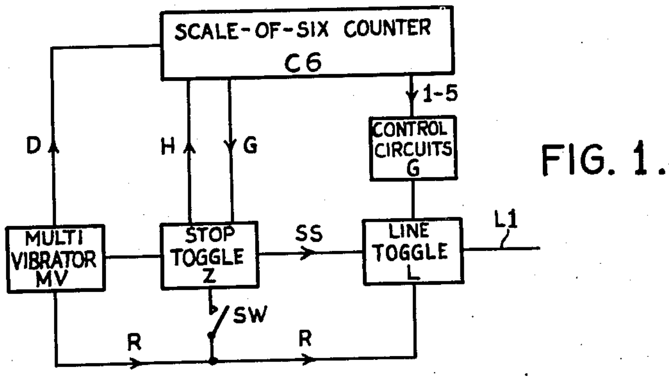

The invention will be better understood from the following description of one embodiment taken in conjunction with the accompanying drawings in which:

Fig. 1 shows a schematic diagram of the arrangement and

Figure 2:
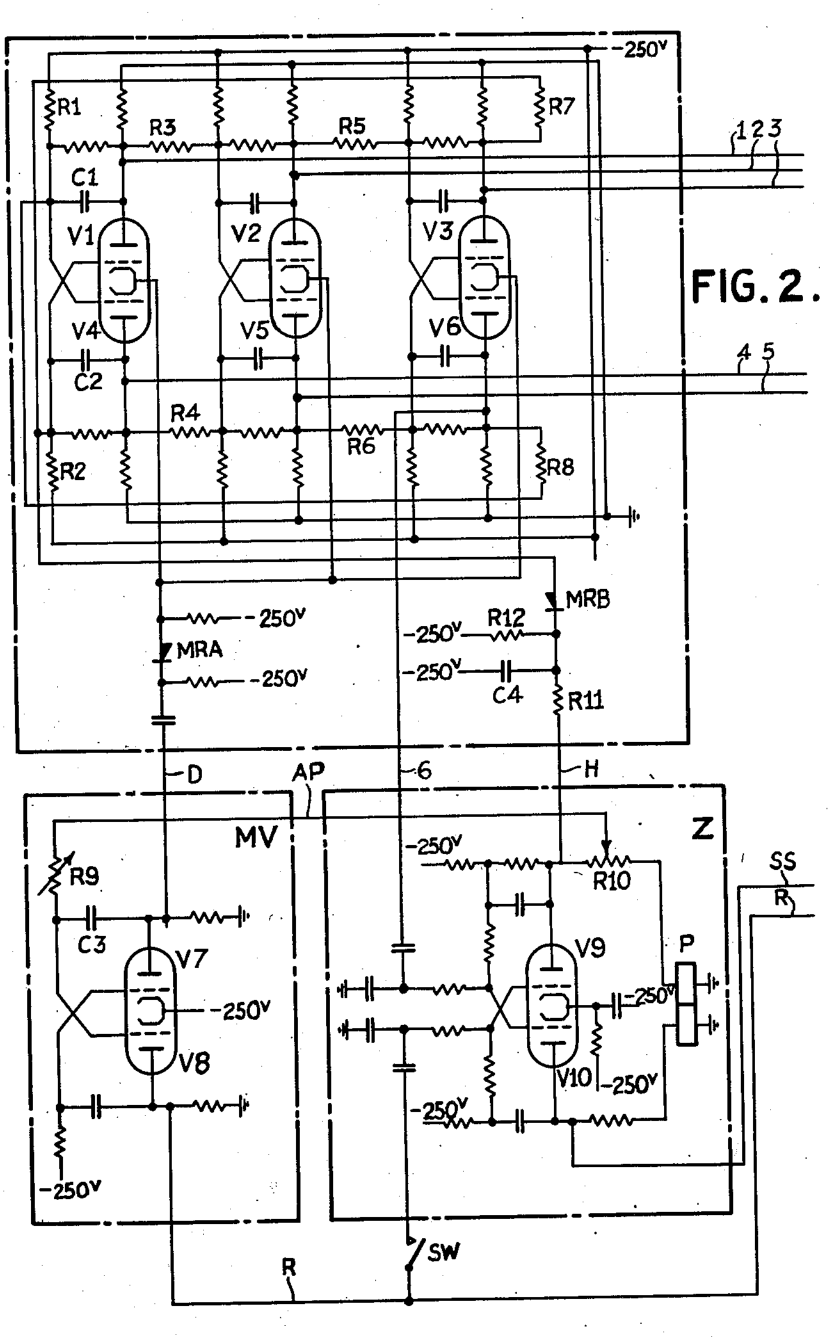

Figs. 2 and 3 when arranged with Fig. 2 on the left show the detailed circuits of the arrangement.

The invention will be described in association with a teleprinter operating on the start-stop principle using a five-unit code. A perforated paper tape is fed through the teleprinter transmitting head which is provided with selector contacts or feelers to sense the holes in the tape. The tape is advanced one step on the transmission of each character by known means controlled by a paper feed relay in the distributor. Double current working is assumed in which as is well known, positive corresponds to a mark and negative to a space. The start signal consists of a space having the same duration as an element of the character code while the stop signal consists of a mark having a longer duration.

Referring to Fig. 1 when no transmission is taking place the switch SW is in the open position shown. The pulse source which is shown as a multivibrator MV operates continuously to feed pulses over leads D and R but these pulses are ineffective in this condition of the circuit. The multivibrator MV is very asymmetric, the ratio of the two-non-conducting periods being of the order of 2000 to 1. In the present embodiment the duration of the two periods is approximately 20 milliseconds and 10 microseconds. The leads D and R are connected one to one valve anode and the other to the other, the arrangement being such that short positive-going pulses are fed over lead D and negative-going pulses of the same duration are fed over lead R. Lead D constitutes the drive lead to the scale-of-six cyclic counter C6 which is arranged to operate on negative-going pulses only while lead R, the reset lead, controls the stop toggle Z and the line toggle L. Both the toggle circuits are also arranged for operation by negative-going pulses so that it will be understood that the cyclic counter will be operated by the trailing edge of the pulses fed over lead D while the toggle circuits will be operated by the leading edges of the pulses fed over lead R, the trailing and leading edges being separated by a period of 10 microseconds, the width of the pulses.

When the switch SW is closed, preferably automatically under the control, for instance, of the paper tape or by other suitable means, the next pulse over the reset lead R causes the transposition of the stop toggle Z which thereupon transmits a negative-going pulse over lead SS to the line toggle L. This toggle is also transposed to change the marking condition on the line L1 to a spacing condition thereby transmitting a start signal over the line.

The transposition of the stop toggle Z also causes a control to be exerted over the hold lead H on the cyclic counter, this control enabling the counter to respond to pulses transmitted thereto over the lead D. However, the lead H is associated with delay means such that the control does not become effective until after the negative-going edge corresponding to the negative-going edge on lead R. Hence the first pulse delivered by the multivibrator is effective over lead R to cause the transmission of the start signal but is ineffective over lead D on the cyclic counter.

Subsequent pulses delivered over lead R to the stop toggle Z are ineffective but these pulses are also fed to the line toggle L and the effect of the second pulse is to transpose the line toggle to terminate the start signal. Whether this transposition of the line toggle is effective on the line relay depends on the first code element of the character to be transmitted as will now be explained.

The cyclic counter C6 is arranged to deliver an impulse over each of the six leads 1 to 6 in succession in response to successive impulses from the multivibrator. The first impulse to be effective on the counter after the closing of the switch SW will be the second pulse delivered over lead D by the multivibrator and this pulse will be 10 microseconds behind the second pulse delivered over lead R. In response to this pulse, a negative-going pulse will be fed over lead 1 to the appropriate one of the gate circuits G. Leads 1 to 5 from the cyclic counter are connected to the gate circuits while lead 6 is connected to the stop toggle Z for a purpose to be described later. Five gate circuits are employed, each corresponding to one element in the code, and are controlled by the five selector contacts in the transmitting head. If the selector contacts are open the gate circuits are closed and the pulses from the cyclic counter do not pass to the line toggle and vice versa. Assuming that gate 1 is open, it will be understood that the pulse from lead 1 will arrive at the line toggle a very short time (of the order of 10 microseconds) after the pulse over the reset lead R. Hence before the line relay is able to respond following transposition due to the reset pulse, the toggle is again transposed due to the pulse from the gate circuit. The five pulses from the cyclic counter are fed successively to the five gate circuits to control through the line toggle L the operation of the line relay to transmit the character corresponding to the perforations in the tape. The sixth pulse is fed to the stop toggle over lead 6 and causes the transposition of this toggle while the corresponding reset pulse controls the line toggle to cause a mark to be transmitted over the line as a stop-signal. The transposition of the stop toggle causes over lead H the cyclic counter to be again insensitive to pulses over the D lead although this control will be again lifted on the next reset pulse if switch SW remains closed. The next reset pulse is delayed for a period which is variable up to twice the duration of a single code element due to a control over lead AP which becomes effective when the stop toggle is transposed at the end of the transmission of a character.

The above-described operation continues until the switch SW is opened and it will be noted that the circuit can only come to rest in one position, that is when the stop signal has been transmitted. The line and stop toggles include relays for controlling the line current and paper feed respectively.

A description will now be given of the detailed circuits shown in Figs. 2 and 3 commencing with the multivibrator MV. This is a substantially conventional circuit but the values of the components in the cross connections between the anodes and grids of the two valves V7 and V8 are such that the ratio of the non-conducting period of the valve V8 to the non-conducting period of the valve V7 is of the order of 2000 to 1, the duration of the non-conducting period of V7 and the conducting period of V8 being approximately 10 microseconds while the conducting period of V7 and the non-conducting period of V8 is approximately 20 milliseconds i. e. the usual duration of one character element. Positive-going 10 microsecond pulses are thus delivered over lead D and negative-going pulses of the same duration are delivered over lead R as previously explained. It will be noted that the charging resistance R9 for condenser C3 is variable to allow for the adjustment of the above-mentioned ratio and the charging voltage is derived from the stop toggle Z. During transmission this charging voltage is close to earth potential since valve V9 is non-conducting but when the stop toggle is transposed on the 6th impulse from the cyclic counter, V9 conducts and the charging voltage is consequently reduced. The duration of the non-conducting period of the valve V8 is thus increased to enable a long marking signal to be transmitted to line, the increase in the duration being adjustable by varying the position of the tapping on the anode resistance R.

The cyclic counter C6 consists of three stages each consisting of a double triode although it will be understood that separate valves may be used if desired. The stage coupling e. g. via C1 and R1 from V1 to V4 and C2 and R2 from V4 to V1, ensure that only one valve of a pair is conducting at any one time, while the inter-stage coupling e. g. via R3 and R4 between stages 1 and 2, R5 and R6 between stages 2 and 3 and R7 and R8 between stages 3 and 1, ensure that assuming valves V1, V2 and V3 are conducting initially then the order in which the valves conduct in response to successive input pulses is V2, V3, V4; V3, V4, V5; V4, V5, V6; V5, V6, V1; V6, V1, V2 and V1, V2, V3.

In the initial condition when no transmission is taking place, valves V4, V5 and V6 are conducting. The component values of the circuit are so chosen that the grid potentials of V2 and V3 are approximately −25 volts but the grid potential of V1, being in part derived from the anode of V3 which is non-conducting is about −15 volts. The input pulses are arranged to have an amplitude of approximately 10 volts negative and are applied in common to the cathodes. A pulse of this amplitude will be sufficient to cause V1 to conduct whereupon the stage triggers and V4 becomes non-conducting. A negative-going pulse is fed from the anode of V1 to lead 1. Valves V5, V6 and V1 are now conducting with valve V2 in the sensitive condition due to its grid potential being derived in part from the anode of V4 which is now non-conducting. In this manner successive input pulses cause the transposition of the stages in the order given above and a negative-going pulse is obtained from each anode as it becomes conducting, the pulses being fed over leads 1, 2, 3, 4, 5 and 6 in that order.

Leads 1 to 5 from the counter C6 are connected to the five gate circuits G1 to G5 (Fig. 3). Each gate circuit includes a selector contact SC1 to SC5 together with a combination of linear and non-linear resistors. The operation of the gate circuits are similar and that of G1 only will be considered in detail. When the selector contacts SC1 are open indicating that a marking signal is to be transmitted to line the point X is at substantially earth potential and the rectifier MRB1 will be non-conducting. On the reception of a pulse over lead 1, the point X will go sharply negative, the rectifier will conduct and the pulse will be shunted to earth over resistance R13. When the contacts are closed, resistances R13 and R15 form a potentiometer and their values are so chosen that the potential at their junction point is approximately −20 volts. Hence point X can go 20 volts negative before any appreciable shunting action takes place. Under these circumstances, the pulse developed across R14 is fed via MRA1 to the line toggle L, the rectifiers MRA1 to MRA5 being provided to prevent any interaction between the gate circuits due to their common output.

The stop toggle circuit Z and the line toggle circuit L are similar and include a thermionic valve arrangement having two stable conditions of equilibrium. Referring first to the stop toggle Z, when no transmission is taking place i. e. a marking condition is on the line L1, the valve V9 is conducting and V10 is cut off. In this condition, as previously mentioned, a control is exerted over the lead H on the counter C6 whereby the latter is unresponsive to pulses fed over lead D. When describing the operation of the counter it was explained that valves V4, V5 and V6 are conducting when no transmission is taking place while V1 is the next to conduct. However, since the multivibrator is operating continuously, it is desirable that the counter should be unaffected by pulses fed over lead D until the switch SW is closed and this control is effected over lead H. Since V9 is conducting, its anode voltage will be considerably below earth potential, while the control grid potential of valve V1 as previously explained is at approximately −15 volts. Under these conditions the rectifier MRB conducts and the potential at the control grid of V1 falls to approximately −25 volts so that V1 is insensitive to pulses over the lead D. When the switch SW is closed, the stop toggle is transposed and V9 becomes non-conducting so that the anode voltage approaches that of earth and the rectifier MRB becomes non-conducting. The hold lead H now has no effect on the counter and V1 becomes sensitive to pulses transmitted over the lead D. In order, however, to enable a start signal to be transmitted over the line, it is necessary to prevent the first pulse over the lead D after the switch SW is closed from affecting the counting circuit and for this purpose the condenser C4 is connected to the hold lead. This condenser is arranged to delay the rise in voltage of the control grid of V1 until after the end of the first pulse transmitted over lead D. As previously mentioned, the counter is triggered by the negative-going trailing edge of the pulses transmitted over lead D while the Z toggle is triggered by the negative-going leading edge of the pulse transmitted over lead R and since these two edges are separated by 10 microseconds, a delay slightly greater than this will be sufficient.

When the valve V10 becomes conducting on the transposition of the toggle Z, a negative-going pulse is fed over lead SS, C5 and R16 to the line toggle L. In the non-transmitting condiitnon, valve V12 is conducting and valve V11 is non-conducting, while the polarised relay M is de-energised, the contact is in the position shown and a marking condiiton is on the line L1. When the negative-going pulse is received over the lead SS, the line toggle L is transposed and the relay M operates to transmit a spacing signal. This signal exists until the next reset pulse is received over the lead R. This will cause the line tozzle L to revert to its original condition. However, the pulse transmitted over the lead D corresponding to this second reset pulse will cause a negative pulse to be transmitted over lead 1 from the counter to the gate circuit G1. Assuming that the gate circuit G1 is open i. e. the selector contacts SC1 are closed, the pulse will pass through the gate circuit and will be effective on the valve V12 a short time after this valve has been made conducting due to the second reset pulse on lead R. The line toggle L is thus again transposed before the relay M has had time to release and the spacing condiiton is retained for the first element of the character.

This condition will exist until the next reset pulse is received by the line toggle which will be transposed to the marking condiiton unless the gate circuit G2 is open when the operation will again be as described above and a space signal will be transmitted. The circuit continues to operate in this way until the five signal elements have been transmitted. The seventh reset pulse which is transmitted at the end of the fifth element ensures that the line toggle is in the marking condition since in this case there is no control via a gate circuit. Further the sixth pulse from the counting circuit is delivered to the control grid of V10 of the stop toggle Z. The stop toggle Z is thus transposed and V9 conducts thus reducing the charging voltage applied to condenser C3 in the multivibrator due to the connection via AP, thereby delaying the transmission of the next reset pulse to give a long stop signal. This reset pulse will be applied to the stop toggle Z and serves to transpose the toggle to transmit a pulse over lead SS as previously described thereby intitiating the transmission of the next character. It should be noted that the stop toggle Z includes a polarised relay P which is energized on the initial transposition of the stop toggle and is released on the second transposition at the end of the transmission of the character in order to step on the tape in readiness for the transmission of the next character.

It will be understood that various modifications may be made in the circuit. For instance, the pulses delivered by the counter may be arranged to be coincident with the reset pulses but of considerably greater amplitude than the reset pulses so that the reset pulses are overwhelmed. The coincidence between reset and drive pulses would be obtained by using one output of the multivibrator for the two series of pulses.

Further the gate circuits may be modified so that only a single rectifier is necessary. Thus the lead, for instance, lead 1, from the cyclic counter will extend to the gate circuit via a condenser to one pole of the rectifier which will correspond to MRA1 of Fig. 3. An earthed resistor and an earthed capacitor will be connected to the lead between the condenser and rectifier and between these two connections will be connected the pecker contacts. Then if the pecker contact is closed to connect direct earth to the lead, the gate circuit is closed and a mark is transmitted to line while if the pecker contacts are open, the gate will be open and a space will be transmitted.

It will be understood, of course, that the distributor may be used with an automatic transmitting head as described above or with a keyboard operated machine. In this case operation of any key as well as controlling the operation of one or more of five code bars also controls the operation of a sixth bar which has for effect the closing of the switch SW to initiate transmission. The code bars will, of course, control contacts similar to the pecker contacts, while in addition the operation of relay P will serve to lock the operated code bars until transmission has been completed.

I claim:

1. In a telegraph distributor, a pulse source, a transmitting device, means for feeding pulses from said source over one path to said transmitting device, means for feeding pulses from said source over a second path to said transmitting device, a plurality of control circuits associated with said second path, means for simultaneously conditioning said control circuits in accordance with the elements of a character to be transmitted, an electronic counter included in said second path for delivering said pulses successively to said control circuits and means in said control circuits for determining in dependence upon the condition thereof which of said successive pulses are to pass therethrough by said transmitting device to enable said transmitting device to be influenced solely by pulses fed over one path to transmit one kind of signal and jointly by pulses fed over both paths to transmit another kind of signals.

2. In an electrical signalling system, a circuit arrangement for dividing line time into a plurality of cyclically recurring equal elements to enable the transmission of an item of information during each element comprising a plurality of gate circuits, means for feeding pulses successively to said gate circuits, mechanically operated means for simultaneously applying to said gate circuits a set of potentials representing items of information to control the opening and closing of said gate circuits and transmitting means operated by the pulses passing through the open gate circuits.

3. In a telegraph distributor, a pulse source, a transmitting device, means for transmitting reset pulses over one path to control the operation of said transmitting device in one sense, means for transmitting drive pulses over a second path to control the operation of said transmitting device in a different sense, means in said second path for grouping said drive pulses into cycles, tape controlled selector contacts associated with said second path, means also in said second path for absorbing selected drive impulses in a cycle as determined by said selector contacts and means in said transmitting device for enabling it to operate in said different sense in response to simultaneously applied drive and reset pulses.

4. In a telegraph distributor, a pulse source, a line toggle circuit, a transmitting relay controlled thereby, means for transmitting reset pulses over one path to control the operation of said line toggle circuit in one sense, to cause said transmitting relay to transmit a mark, means for transmitting drive pulses over a second path to control the operation of said line toggle circuit in a different sense to cause said transmitting relay to transmit a space, a cyclic electronic counter in said second path, tape-controlled selector contacts associated with said second path, means also in said second path for absorbing selected drive impulses in a cycle as determined by said selector contacts and means in said line toggle circuit for enabling said transmitting relay to transmit a space in response to drive and reset pulses simultaneously applied to said line toggle circuit.

5. A telegraph transmitter as claimed in claim 4 wherein means are provided for ensuring that the drive pulses applied to said line toggle circuit are coincident with said reset pulses and have a greater amplitude than said reset pulses.

6. A telegraph transmitter as claimed in claim 4 wherein means are provided for delaying the application of the drive pulses to said line toggle circuit with respect to said reset pulses.

7. In a telegraph distributor, a multivibrator circuit, a transmitting device, means for transmitting reset pulses from said multivibrator circuit over one path to control the operation of said transmitting device in one sense, means for transmitting drive pulses from said multivibrator circuit over a second path to control the operation of said transmitting device in a different sense, means in said second path for grouping said drive pulses into cycles, selecting means associated with said second path, means also in said second path for absorbing selected drive pulses in a cycle as determined by said selecting means and means in said transmitting device for enabling it to operate in said different sense in response to simultaneously applied drive and reset pulses.

8. A telegraph distributor as claimed in claim 7 wherein said multivibrator circuit is asymmetric and means are provided for deriving the reset pulses from the negative-going edge of one anode waveform and the drive pulses from the negative-going edge of the other waveform whereby said drive pulses are delayed with respect to said reset pulses.

9. A telegraph distributor as claimed in claim 7 wherein said multivibrator circuit is asymmetric and means are provided for deriving the drive and reset pulses from the negative-going edge of one of said anode waveforms whereby said pulses are coincident.

10. In a start-stop telegraph distributor employing a code having a fixed number of elements, a line, a multivibrator, a stop toggle circuit, a transmitting device, means in said stop toggle circuit responsive to a pulse transmitted thereto from said multivibrator for changing over said stop toggle circuit, means responsive to the changeover of said stop toggle circuit for controlling said transmitting device to transmit a start signal over said line and for enabling subsequent pulses from said multivibrator circuit to control said transmitting device to transmit over said line marking and spacing signals corresponding to the elements of the code, means in said stop toggle circuit responsive to a pulse transmitted thereto subsequent to the pulse corresponding to the last element of the code for changing over said stop toggle circuit, means in said transmitting device for responding to said second changeover of said stop toggle circuit for transmitting a stop signal over said line and means responsive to said second changeover of said stop toggle circuit for delaying the generation of the next pulse by said multivibrator in order to lengthen said stop signal.

11. A telegraph distributor as claimed in claim 10 wherein said second changeover of said stop toggle circuit reduces the charging voltage applied to said multivibrator circuit.

12. In a telegraph distributor, a multivibrator circuit a cyclic electronic counter having a scale greater by one than the number of elements in the code employed, a plurality of gate circuits one for each element of the code, tape-controlled selector contacts for opening said gate circuits, a stop toggle circuit, a line toggle circuit, control connections from said stop toggle circuit and from said gate circuits to said line toggle circuit, a transmitting device controlled by said line toggle circuit, means for feeding pulses from said multivibrator circuit to said electronic counter and to said line and stop toggle circuits, switching means in said stop toggle circuit for preventing said pulses being effective until after the operation thereof, means for applying the first pulse after the operation of said switching means to said line and stop toggle circuits only to effect change-over of said stop toggle circuit and line toggle whereby said transmitting device is caused to transmit a start signal, means for rendering subsequent pulses in the cycle effective on said electronic counter and said line toggle circuit, the successive pulses delivered from said electronic counter being fed through the open ones of said gate circuits to said line toggle circuit in opposition to the pulses fed directly thereto, means for causing said line toggle circuit to respond to the pulses fed thereto from said gate circuits when pulses over both paths are present whereby said transmitting device is caused to transmit a spacing signal, means for causing said line toggle circuit to respond to the pulses fed directly thereto whereby said transmitting device is caused to transmit a marking signal, means for feeding the last pulse of the cycle delivered by said electronic counter to said stop toggle circuit to changeover said stop toggle circuit and said line toggle circuit whereby said transmitting device is caused to transmit a stop signal and means in said stop toggle circuit for delaying the next pulse delivered by said multivibrator circuit in order to lengthen the duration of said stop signal.

GEORGE THOMAS BAKER.

REFERENCES CITED

The following references are of record in the file of this patent:

UNITED STATES PATENTS

| Number | Name | Date |
|---|---|---|
| 2,468,462 | Rea | Apr. 26, 1949 |